United States Patent
Schoenherr

(10) Patent No.: US 10,062,882 B2
(45) Date of Patent: Aug. 28, 2018

(54) FORCE GENERATING ASSEMBLY FOR A BATTERY PACK

(71) Applicants: Bosch Battery Systems LLC, Orion, MI (US); Robert Bosch GmbH, Stuttgart (DE)

(72) Inventor: Robert Schoenherr, Oxford, MI (US)

(73) Assignees: Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 195 days.

(21) Appl. No.: 15/147,592

(22) Filed: May 5, 2016

(65) Prior Publication Data

US 2017/0110696 A1     Apr. 20, 2017

Related U.S. Application Data

(60) Provisional application No. 62/242,364, filed on Oct. 16, 2015.

(51) Int. Cl.
| | |
|---|---|
| *H01M 2/10* | (2006.01) |
| *H01M 10/0525* | (2010.01) |
| *H01M 10/04* | (2006.01) |
| *H01M 10/0585* | (2010.01) |

(52) U.S. Cl.
CPC ..... *H01M 2/1077* (2013.01); *H01M 10/0481* (2013.01); *H01M 10/0525* (2013.01); *H01M 10/0585* (2013.01); *H01M 2220/20* (2013.01)

(58) Field of Classification Search
None
See application file for complete search history.

(56) References Cited

U.S. PATENT DOCUMENTS

| | | |
|---|---|---|
| 3,429,747 A | 2/1969 | Deseniss |
| 3,841,914 A | 10/1974 | Boyle et al. |
| 4,060,670 A | 11/1977 | Tamminen |
| 4,939,047 A | 7/1990 | Nagashima |
| 5,008,785 A | 4/1991 | Maglica et al. |

(Continued)

FOREIGN PATENT DOCUMENTS

| | | |
|---|---|---|
| CN | 204792992 | 11/2015 |
| EP | 1341245 | 10/2012 |

(Continued)

OTHER PUBLICATIONS

PCT International Search Report PCT/EP2016/73044 dated Nov. 14, 2016 (5 pages).

*Primary Examiner* — Scott J Chmielecki
(74) *Attorney, Agent, or Firm* — Kelly McGlashen; Maginot Moore & Beck LLP

(57) ABSTRACT

A battery pack includes a battery pack housing and an array of pouch cells disposed in the pack housing. The battery pack also includes a force generating assembly disposed in the battery pack housing. The force generating assembly is configured to apply a force to the array of cells along a first direction corresponding to a row of cells, and a force to the array of cells along a second direction corresponding to a column of cells. The forces result in a weld-free, direct electrical connection being formed between a first pair of adjacent cells within a row, and the second force results in a weld-free, direct electrical connection being formed between a second pair of adjacent cells within a column.

15 Claims, 7 Drawing Sheets

(56) References Cited

U.S. PATENT DOCUMENTS

| | | | |
|---|---|---|---|
| 5,250,371 | A | 10/1993 | Kleinert, III et al. |
| 5,346,786 | A * | 9/1994 | Hodgetts ............. H01M 2/1016 |
| | | | 429/121 |
| 5,384,212 | A | 1/1995 | Heiman et al. |
| 5,756,229 | A | 5/1998 | Pyszczek et al. |
| 6,899,975 | B2 | 5/2005 | Watanabe et al. |
| 8,465,866 | B2 | 6/2013 | Kim |
| 2003/0017387 | A1 * | 1/2003 | Marukawa .......... H01M 2/1077 |
| | | | 429/156 |
| 2006/0093899 | A1 | 5/2006 | Jeon et al. |
| 2010/0104940 | A1 * | 4/2010 | Wang ..................... B32B 1/02 |
| | | | 429/163 |
| 2010/0266891 | A1 | 10/2010 | Kwon et al. |
| 2014/0023893 | A1 | 1/2014 | Shimizu et al. |
| 2014/0106199 | A1 | 4/2014 | Meintschel et al. |
| 2015/0050536 | A1 | 2/2015 | Bae |
| 2015/0340669 | A1 | 11/2015 | Aoki |

FOREIGN PATENT DOCUMENTS

| | | |
|---|---|---|
| JP | 3565207 | 9/2003 |
| WO | 2014125605 | 8/2014 |

* cited by examiner

FORCE GENERATING ASSEMBLY FOR A BATTERY PACK

BACKGROUND

1. Field of the Invention

The present invention relates to a battery pack that includes a housing, an array of electrochemical cells disposed in the housing, and a force generating assembly disposed in the battery pack between the housing and the array. The force generating assembly applies a force to the array in two orthogonal directions, whereby direct contact, weld-free electrical connections are made between terminals of adjacent cells and/or between terminals of the cells and the terminals of the battery pack.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are also used to power fully electric vehicles including some plug-in electric vehicles. Battery packs are formed of a plurality of battery modules, where each battery module includes several electrochemical cells. The cells may have various housing configurations, including prismatic, cylindrical and pouch. The cells within a module are electrically connected in series or in parallel. Likewise, the battery modules within a battery pack are electrically connected in series or in parallel.

Some conventional battery packs contain cells that are connected together via welding to form an electrical circuit with a bus bar system. Battery control and disconnect devices may also be connected via welding to the cells to the bus bar system. Since battery packs used in vehicles frequently include hundreds of cells, forming the welded electrical connections between each element of the battery system can be labor intensive and costly. Moreover, the bus bars and/or other electrical connectors disposed in the battery pack occupy a relatively large proportion of the space within the battery pack housing, whereby the volumetric efficiency of the battery pack is reduced.

SUMMARY

In some aspects, a battery pack that is configured to receive an array of electrochemical cells includes a battery pack housing, and the array of electrochemical cells disposed within the battery pack housing. Each cell includes a cell housing formed of a metal film laminate material, an electrode assembly disposed in the cell housing, and a force generating assembly disposed in the battery pack housing. The force generating assembly is configured to apply a first force to the array of electrochemical cells along a first direction and a second force to the array of electrochemical cells along a second direction, where the second direction is orthogonal to the first direction.

The battery pack may include one or more of the following features: The first force results in an electrical connection being formed between a first pair of adjacent cells, and the second force results in an electrical connection being formed between a second pair of adjacent cells. The force generating assembly includes a pressure plate and an elastic member that is disposed between the pressure plate and the battery pack housing. The pressure plate abuts a cell housing, and the elastic member is arranged to urge the pressure plate away from the battery pack housing. The elastic member is a spring. The force generating assembly includes a pressure plate, and a lever arm rotatably mounted to the battery pack housing. The lever arm is rotatable between a first position in which the lever arm does not urge the pressure plate in one of the first direction and the second direction, and a second position in which the lever arm urges the pressure plate in one of the first direction and the second direction. Each cell includes an electrically conductive cell positive terminal disposed on an outside of the cell housing, the cell positive terminal being electrically connected to a positive electrode of the electrode assembly. Each cell includes an electrically conductive cell negative terminal disposed on an outside of the cell housing, the cell negative terminal being electrically connected to a negative electrode of the electrode assembly. The cells are arranged within the battery pack housing such that the cell positive terminal of at least one cell faces the cell negative terminal of an adjacent cell, and the force generating assembly is disposed between at least one of the cells and the cell housing so as to urge the cells of the array into direct contact in such a way that the cell positive terminal of at the least one cell directly contacts, and forms an electrical connection with, the cell negative terminal of the adjacent cell. Each cell housing is a rectangular polygon. One of the positive terminal and negative terminal overlies three sides of the cell housing, and the other of the positive terminal and the negative terminal overlies one side of the cell housing, where the one side is different from, and shares a circumference with, the three sides. The electrochemical cell array comprises a two dimensional array of cells defined by rows of cells and columns of cells, and a force generating assembly is disposed in the battery pack housing at an end of each row and at an end of each column.

In some aspects, a battery pack includes a battery pack housing having a base plate, and a sidewall that surrounds the base plate. The battery pack includes an array of electrochemical cells disposed within the battery pack housing, each cell comprising a cell housing formed of a metal film laminate material, an electrode assembly disposed in the cell housing, and an electrically conductive cell positive terminal disposed on an outside of the cell housing, the cell positive terminal being electrically connected to a positive electrode of the electrode assembly. Each cell also includes an electrically conductive cell negative terminal disposed on an outside of the cell housing, the cell negative terminal being electrically connected to a negative electrode of the electrode assembly. The cells are arranged within the battery pack housing such that the cell positive terminal of at least one cell faces the cell negative terminal of an adjacent cell, and a force generating assembly disposed in the battery pack housing, the force generating assembly comprising a pressure plate and an elastic element disposed between the sidewall and the pressure plate. The force generating assembly is disposed between at least one of the cells and the cell housing so as to urge the cells of the array into direct contact in such a way that the cell positive terminal of at the least one cell directly contacts, and forms an electrical connection with, the cell negative terminal of the adjacent cell.

The battery pack may include one or more of the following features: The force generating assembly includes a first a pressure plate and a first elastic element disposed between a first portion of the sidewall and the first pressure plate, the first pressure plate and the first elastic element cooperating to apply a first force to the array of electrochemical cells along a first direction. In addition, the force generating assembly includes a second pressure plate and a second elastic element disposed between a second portion of the sidewall and the second pressure plate, the second pressure plate and the second elastic element cooperating to apply a second force to the array of electrochemical cells along a second direction. The second direction is orthogonal to the first direction. The first force results in an electrical connection being formed between a first pair of adjacent cells, and the second force results in an electrical connection being formed between a second pair of adjacent cells. Each of the first elastic member and the second elastic member is a spring. Each cell includes an electrically conductive cell positive terminal disposed on an outside of the cell housing, the cell positive terminal being electrically connected to a positive electrode of the electrode assembly, and an electrically conductive cell negative terminal disposed on an outside of the cell housing, the cell negative terminal being electrically connected to a negative electrode of the electrode assembly. The cells are arranged within the battery pack housing such that the cell positive terminal of at least one cell faces the cell negative terminal of an adjacent cell, and the force generating assembly is disposed between at least one of the cells and the cell housing so as to urge the cells of the array into direct contact in such a way that the cell positive terminal of at the least one cell directly contacts, and forms an electrical connection with, the cell negative terminal of the adjacent cell. Each cell housing is a rectangular polygon, one of the positive terminal and negative terminal overlies three sides of the cell housing, and the other of the positive terminal and the negative terminal overlies one side of the cell housing, where the one side is different from, and shares a circumference with, the three sides. The electrochemical cell array comprises a two dimensional array of cells defined by rows of cells and columns of cells, and a force generating assembly is disposed in the battery pack housing at an end of each row and at an end of each column. The electrochemical cell array comprises a two dimensional array of cells defined by rows of cells and columns of cells, and a force generating assembly is disposed in the battery pack housing at each end of each row and at each end of each column.

In some aspects, a battery pack includes a battery pack housing, and is configured to receive an array of pouch cells. Each cell of the array includes a cell housing formed of a metal film laminate material, and an electrode assembly disposed in the cell housing. The cells are arranged in rows and columns within the battery pack housing. The battery pack also includes a force generating assembly disposed in the battery pack housing. The force generating assembly is configured to apply a force to the array of cells along a first direction and a force to the array of cells along a second direction, where the second direction is orthogonal to the first direction. The forces result in a direct contact, weld-free electrical connection being formed between a first pair of adjacent cells within a row, and the second force results in a direct contact, weld-free electrical connection being formed between a second pair of adjacent cells within a column Since the electrical connections are made via direct contact and are weld-free, manufacturing costs are reduced and volumetric efficiency of the battery pack is increased relative to some conventional battery packs.

DETAILED DESCRIPTION

Figure 1:
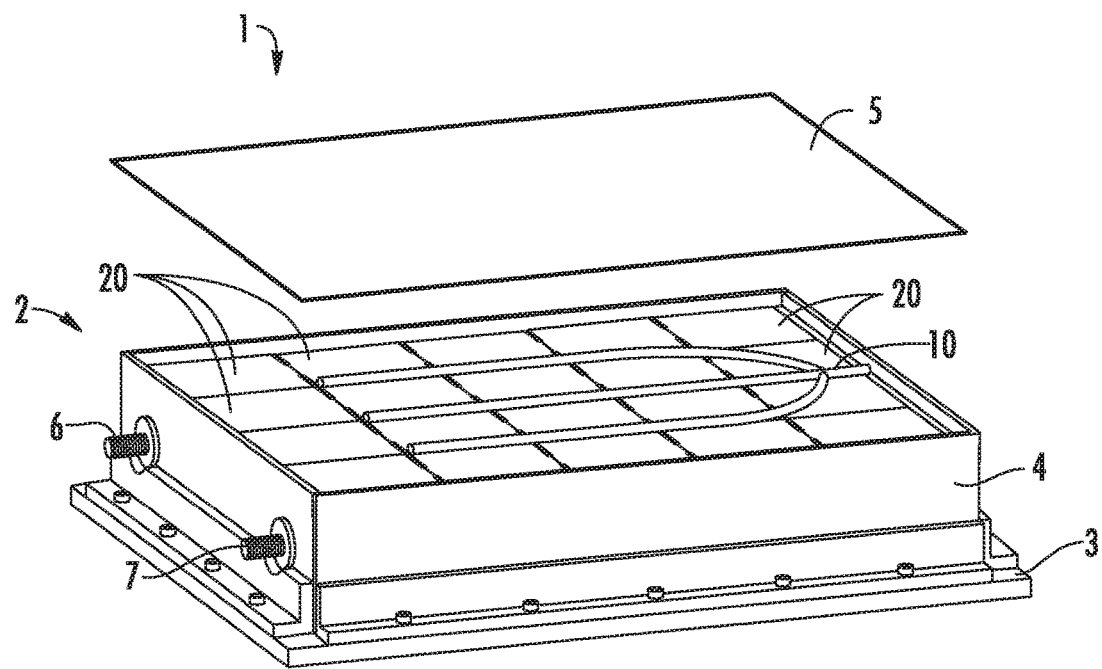
FIG. 1 a partially exploded perspective view of a battery pack including an array of prismatic cells, each cell having the three side-and-one side terminal configuration.
Figure 2:
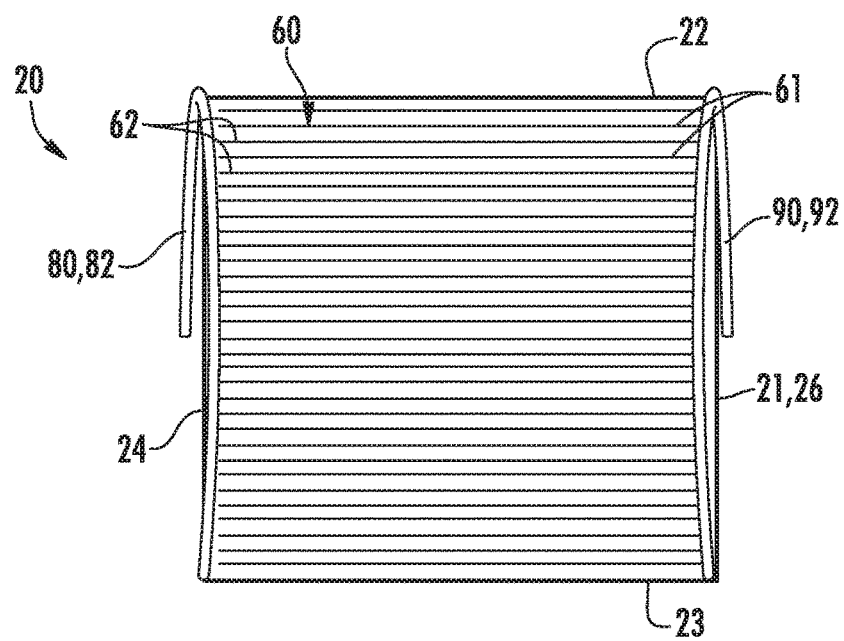
FIG. 2 is a schematic cross sectional view of a prismatic cell as seen across line 2-2 of FIG. 3.

Referring to FIGS. 1-6, a battery pack 1 used to provide electrical power includes electrochemical cells 20 that are electrically interconnected and stored in an organized manner within a battery pack housing 2. The cells 20 are lithium-ion cells that include an electrode assembly 60 that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery module and/or within the battery pack housing 2, the cells 20 are electrically connected in series or in parallel, as discussed further below.

The cells 20 include a pouch-type cell housing 21 formed of a metal laminated film. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

The electrode assembly 60 includes a series of stacked positive electrode plates 61 alternating with negative electrode plates 62 and separated by intermediate separator plates (not shown). The electrode plates are very thin (e.g., having a thickness on the order of about 0.095 to 0.145 mm) compared to the overall cell thickness (e.g. having a thickness on the order of tens or hundreds of mm) and thus are illustrated schematically in FIG. 2.

A first terminal 80 is electrically connected to the positive electrode plates 61, and a second terminal 90 is electrically connected to the negative electrode plates 62. The first and second terminals 80, 90 are thin strips or bands of electrically conductive material such as copper or aluminum. As used herein, the term "thin strip" refers to an elongated shape in which the material thickness is very small relative to the material width and length, and in which the material width is small relative to the material length. The first and second terminals 80, 90 may be sufficiently thin so as to be manually malleable. The first and second terminals 80, 90 pass through the first end 22 of the cell housing 21 in a sealed manner.

The first terminal 80 includes a leg portion 82 having a proximal end that is connected to the positive electrode plates 61 and an opposed distal end. The first terminal also includes a band portion 83 formed at the distal end of the leg portion 82. The leg portion and the band portion 83 are arranged in a "T" configuration such that the band portion 83 extends in a direction transverse to the leg portion 82. The second terminal 90 includes a leg portion 92 having a proximal end that is connected to the positive electrode plates 61, but does not include a transverse band at a distal end thereof.

Figure 3:
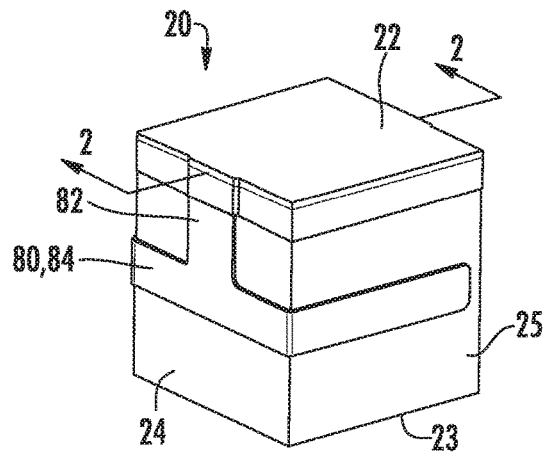
FIG. 3 is a perspective view of the first and second sides of the prismatic cell.
Figure 4:
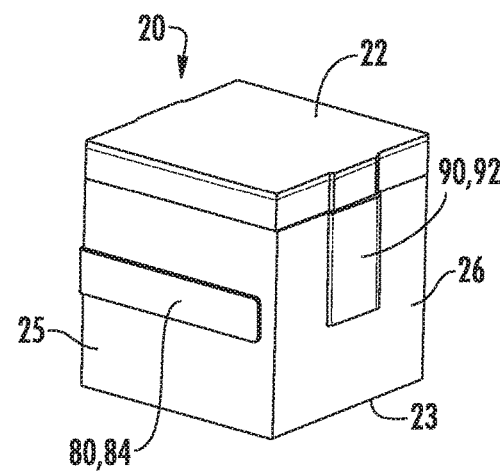
FIG. 4 is a perspective view of the second and third sides of the prismatic cell.
Figure 5:
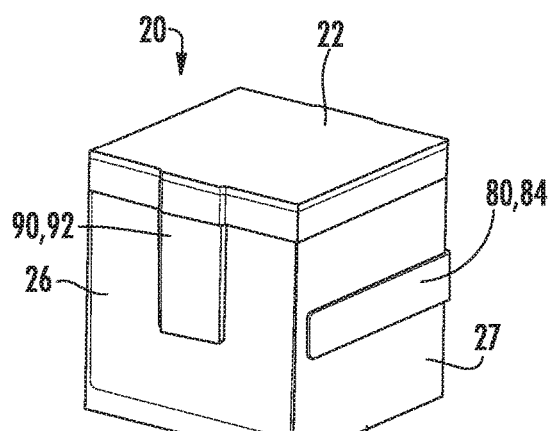
FIG. 5 is a perspective view of the third and fourth sides of the prismatic cell.
Figure 6:
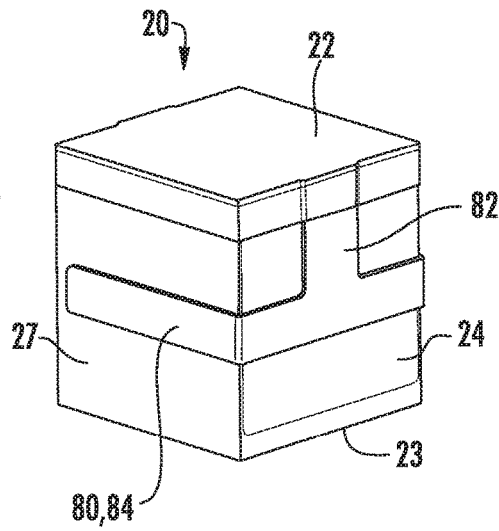
FIG. 6 is a perspective view of the fourth and first sides of the prismatic cell.
Figure 7:
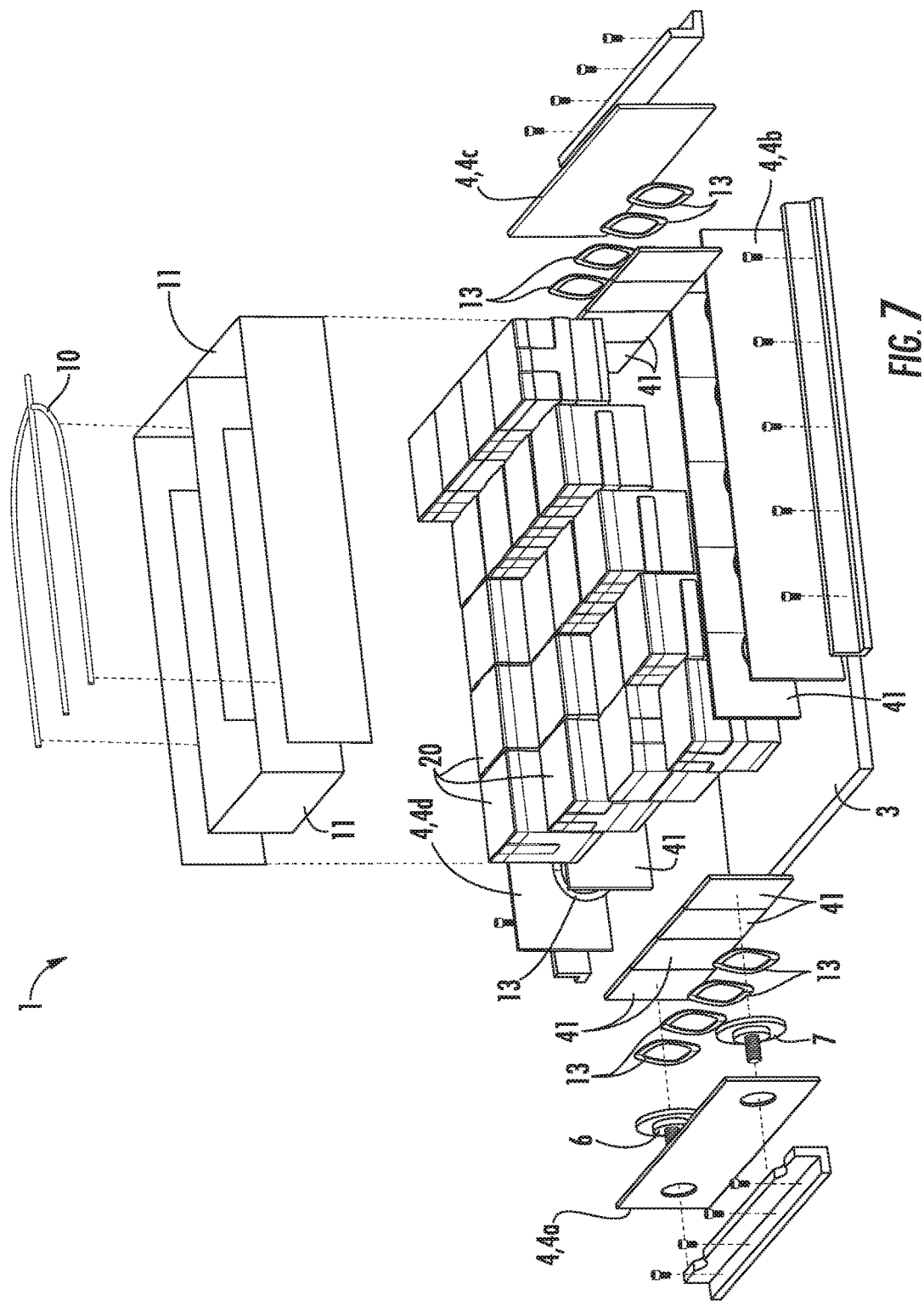
FIG. 7 is an exploded view of the battery pack.
Figure 8:
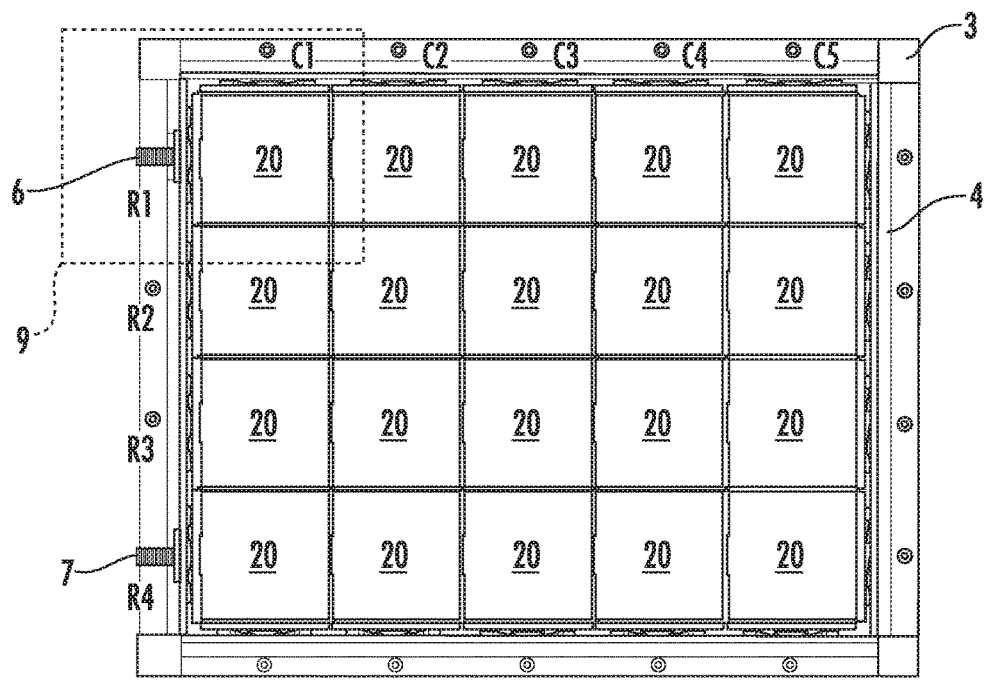
FIG. 8 is a top view of the battery pack with the lid omitted.

The leg portion 82 of the first terminal 80 protrudes through the first end 22 along the first side 24 in a direction normal to the first end 22, and is folded over the first side 24 so that the leg portion 82 overlies the first side 24. The leg portion 82 has sufficient length to overlie an approximate center of the first side 24. The band portion 83 is folded about a circumference of the cell housing 21 to closely overly and conform to the shape of the cell housing 21. The band portion 83 has a length sufficient to permit the band portion 83 to extend along the first side 24 and be wrapped around, and overlie central portions of, the second side 25 and the fourth side 27 (FIGS. 3 and 6). Similarly, the leg portion 92 of the second terminal 90 protrudes through the first end 22 along the third side 26 in a direction normal to the first end 22, and is folded over the third side 26 so as to overlie the third side 26. The leg portion 92 has sufficient length to overlie an approximate center of the third side 26 (FIGS. 4 and 5).

No portions of the first or second terminals 80, 90 overlie the first end 22 or the second end 23 of the cell housing 21, and the first end 22 and the second end of the cell housing 21 are electrically neutral.

In some embodiments, the stiffness of the conductive material is sufficient to retain the first terminal 80 and the second terminal 90 in the above-described folded configuration relative to the cell housing 21. In some embodiments, the first and second terminals 80, 90 are secured to an outer surface of the cell housing 21, for example using adhesive or other techniques.

The above described configuration of the first and second terminals 80, 90 provides a "three side-and-one side" arrangement that permits an array of cells 20 to be electrically interconnected without additional mechanical structures and/or joining processes, since an electrical connection can be formed between adjacent cells 20 simply by spatially orienting and positioning adjacent cells 20 so that terminals of opposed polarity are facing each other and touching. Multiple cells 20 can be arranged in series, parallel or a combination thereof by arranging an array of cells 20 in an appropriate combination of cell orientations. In addition, circuit paths can be made to turn corners by appropriately orienting certain cells 20 of the array.

Referring to FIGS. 1 and 7-10, an exemplary embodiment of a battery pack 1 including an array of cells 20 having a serial arrangement will now be described.

The battery pack housing 2 includes a base plate 3 and a sidewall 4 having one end joined to and surrounding a periphery of the base plate 3. The battery pack housing 2 also includes a lid 5 that is detachably connected to an opposed end of the sidewall 4. The battery pack 1 includes a positive battery pack terminal 6 and a negative battery pack terminal 7 which are supported on, and extend through, a first sidewall portion 4a of the sidewall 4.

The array of battery cells 20 is disposed within the battery pack housing 2 such that an end, for example the second end 22, of each cell 20 faces the base plate 3 of the battery pack housing 2. The cells 20 are arranged in a grid pattern so as to include rows R1, R2, R3 R4 of battery cells 20 and columns C1, C2, C3, C4, C5 of battery cells 20. Each row R1, R2, R3, R4 has a sequential row number and includes n cells 20, where n is an integer corresponding to the number of cells 20 in the row. In the illustrated embodiment, n equals 5. To achieve a serial electrical connection between adjacent cells 20, all the cells 20 of each row R1, R2, R3, R4 have the same spatial orientation except one cell 20 disposed at an end of a given row. For example, the nth cell 20($n$) of the odd numbered rows R1, R3 and first cell 20(1) of the even numbered rows R2, R4 have a different spatial orientation than the remaining cells 20 of the same row. The orientation of the one cell at the end of a given row is different from the orientation of the remaining cells of the row to permit the serial electrical connection to be made with the adjacent row.

In the illustrated embodiment, the cells 20 of the odd numbered rows R1, R3 are arranged so that the first side 24 of the first cell 20(1) through (n−1)th cell 20($n$−1) faces the first sidewall portion 4a of the sidewall 4. As a result, the first terminal 80 of the first cell 20(1) of the first row R1 abuts, and forms an electrical connection with, the positive battery pack terminal 6. In addition, the second terminal 90 of the first cell 20(1) through (n−1)th cell 20($n$−1) abuts, and forms an electrical connection with the first terminal 80 of the adjacent cell in the row. The nth cell 20($n$) of the odd numbered rows R1, R3 is rotated 90 degrees relative to the remaining cells of the same row such that the second side 25 of the nth cell 20($n$) faces the first sidewall portion 4a of the sidewall 4 whereby the first terminal 80 forms an electrical connection with second terminal 90 of (the n−1)th cell 20($n$−1). In addition, in the odd numbered row, the third side 26 of the nth cell 20($n$) faces the second side 25 of the nth cell 20($n$) in the adjacent row, whereby the second terminal 90 of the nth cell 20($n$) forms an electrical connection with nth cell 20 ($n$) in the (next) adjacent row.

The second cell 20(2) through nth cells 20($n$) of the even numbered rows R2, R4 are arranged so that the third side 26 of the second cell 20(2) through nth cells 20($n$) faces the first sidewall portion 4a of the sidewall 4. This orientation of the second cell 20(2) through nth cells 20($n$) permits the nth cell 20($n$) of the even numbered row R2, R4 to form the serial electrical connection with the nth cell 20($n$) of the (previous) adjacent row. By this orientation, the second terminal 90 of the second cell 20(2) through nth cells 20($n$) abuts, and forms an electrical connection with the first terminal 80 of the adjacent cell in the row. The first cell 20(1) of the even numbered rows R2, R4 is rotated 90 degrees relative to the remaining cells of the row such that the second side 25 faces the first sidewall portion 4a of the sidewall 4, and the third side 26 faces the (next) adjacent row, whereby the second terminal 90 of the first cell 20(1) forms an electrical connection with first cell 20(1) in the (next) adjacent row.

The electrical connection between adjacent cells 20 is assured by urging the cells 20 of a row together so that the first terminal 80 of one cell contacts and forms an electrical connection with the second terminal 90 of the adjacent cell 20. In some embodiments, a compression force along the cell rows is achieved by providing a force generating assembly 40 between the cells 20 of the row and the sidewall 4 of the battery pack housing 2. For example, a force generating assembly 40 can be disposed at one or both ends of each row R1, R2, R3, R4 to ensure positive contact between adjacent cells 20 of the row. Similarly, a force generating assembly 40 can be disposed at one or both ends of each column C1, C2, C3, C4, C5 to ensure positive contact between adjacent cells 20 of the column. The force generating assembly 40 is described in detail below.

In the illustrated embodiment, the last row is the fourth row R4, e.g., an even numbered row. However, in order to connect the serially-connected array of cells to the battery pack negative terminal 7 located on the first sidewall portion 4a of the sidewall 4, the first cell 20(1) of the row R4 has the same spatial orientation as the remaining cells 20 of the row R4. As a result, the first cell 20(1) of the last row is oriented so that the second terminal 90 of the first cell 20(1) abuts and forms an electrical connection with the battery pack negative terminal 7 and the first terminal 80 of the first cell 20(1) forms an electrical connection with the second cell 20(2) of the same row R4.

Electrically insulative sheets 11 are disposed between the cells 20 and the battery pack housing 2, as well as between adjacent cell rows except at appropriate row ends to prevent short circuiting of the serial conductive path through the array of cells 20.

The battery pack 1 may also include a sensor lead harness 10 that enables the state of each cell to be monitored. The sensor lead harness 10 may be connected to a battery system controller (not shown) that may disposed within the battery pack housing 2 or at an external location.

Figure 9:
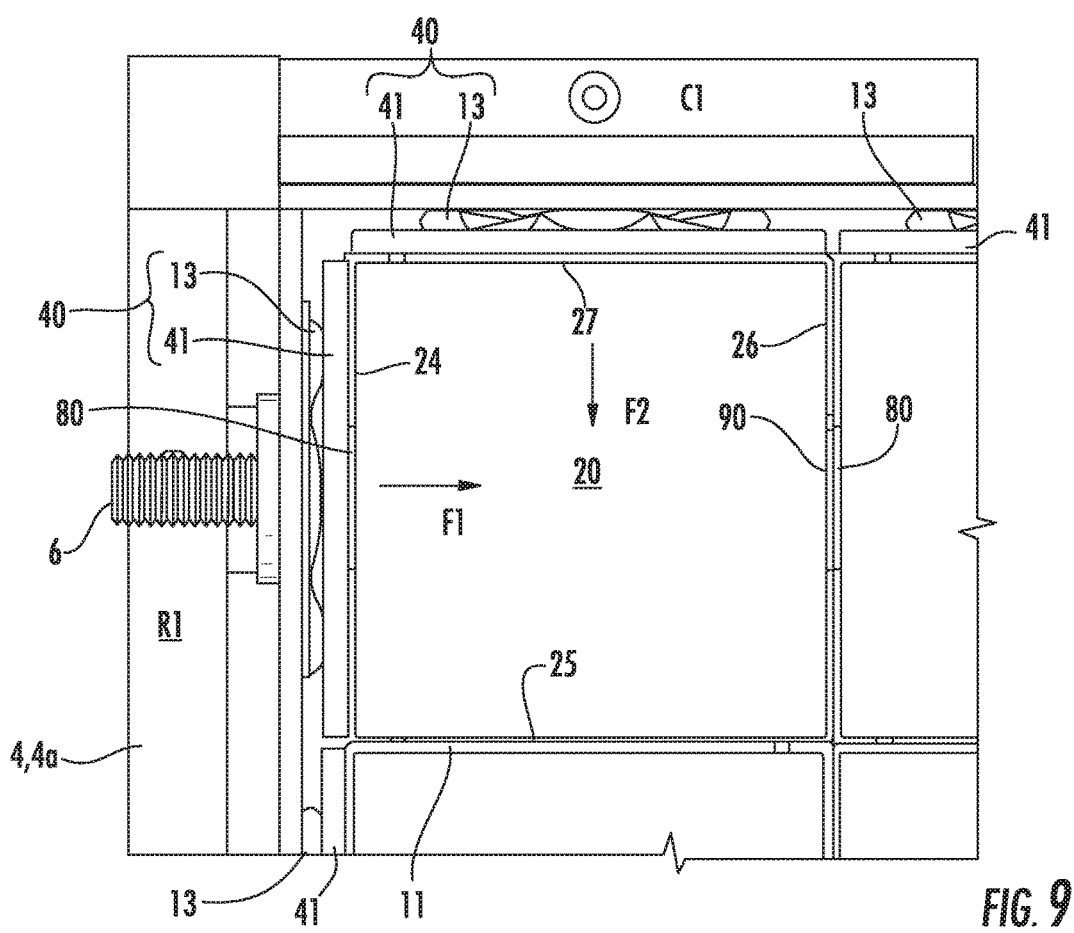
FIG. 9 is an enlarged view of a portion of the battery pack, the portion indicated by the area outlined in dashes in FIG. 8.
Figure 10:
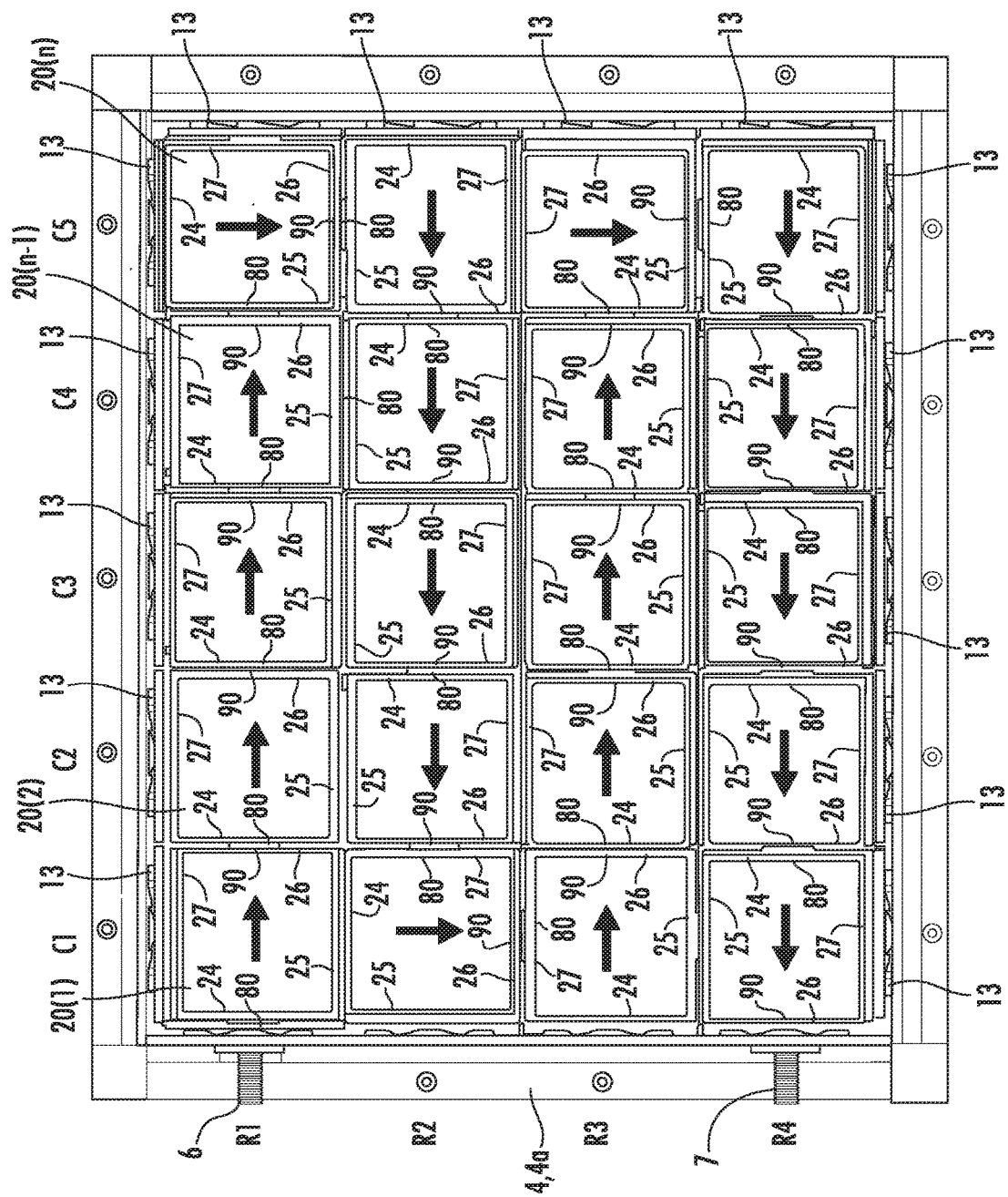
FIG. 10 is a top view of the battery pack with the lid omitted, marked with arrows indicating the serial current path through the array of cells.
Figure 11:
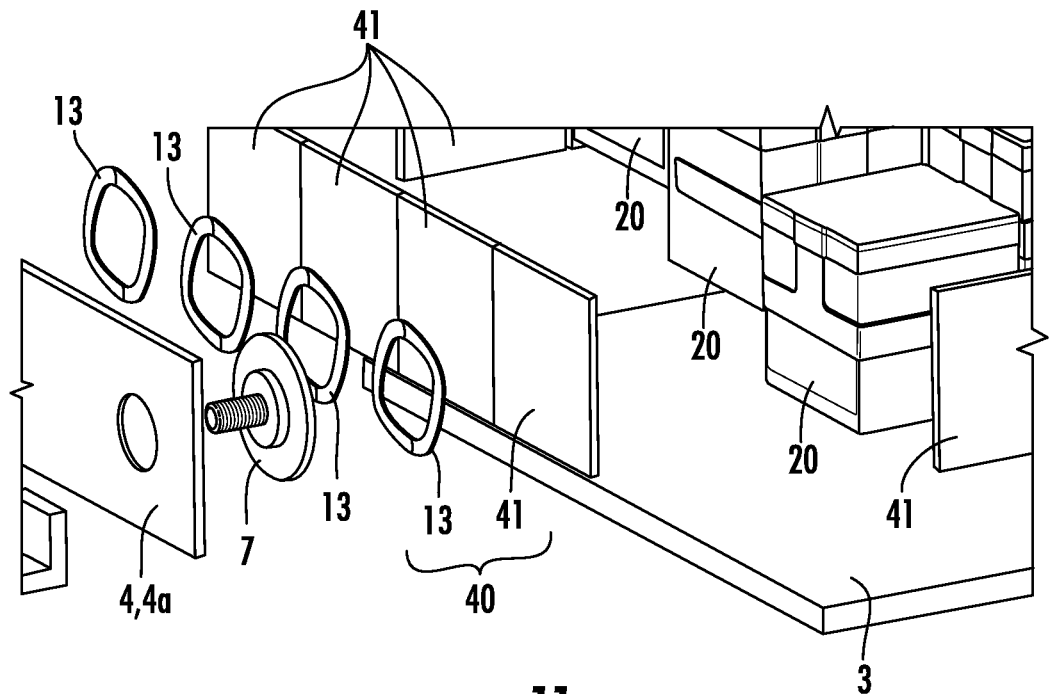
FIG. 11 is an enlarged exploded view of a portion of the battery pack illustrating the force generating assembly.

Referring to FIGS. 9 and 11, the force generating assembly 40 includes a pressure plate 41 and an elastic member 13 that is disposed between the pressure plate 41 and the battery pack housing 4. The pressure plate 41 is shaped and dimensioned to correspond to the shape and dimensions of a side of the cell housing 21. Thus, in the illustrated embodiment, the pressure plate 41 is square in shape and has the same, or slightly smaller, size as the cell housing side (for example, first side 24 as seen in FIG. 9). By providing a pressure plate 41 that has the same size, or is slightly smaller than, the size of the cell housing side, loads applied by the force generating device 40 are evenly distributed across the area defined by the cell side.

The elastic member 13 may be a spring. In the illustrated embodiment, the elastic member 13 is a wave spring, but other types of springs may be used including cylindrical coil springs, conical coil springs, leaf springs, Belleville washers, pneumatic springs, foam pads, etc.

The pressure plate 41 abuts a cell housing 21 of the outermost cell 20 of the row R or column C, and the elastic member 13, which is disposed under compression between the battery pack housing sidewall 4 and the pressure plate 41, urges the pressure plate 41 away from the battery pack housing 4.

A force generating assembly 40 is disposed in the battery pack housing 2 at an end of each row R and at an end of each column C. In the illustrated embodiment, a force generating assembly 40 is disposed in the battery pack housing 2 at each end of each row R and at each end of each column C. As a result of this arrangement, the force generating assembly 40 is configured to apply a first force F1 to the array of cells 20 along a first direction (e.g., along a row, for example the first row R1) and a second force F1 to the array of cells 20 along a second direction (e.g., along a column, for example the first column C1), where the second direction is orthogonal to the first direction. The force generating assemblies 40 urge the cells 20 of the array into direct contact in such a way that the cell positive terminal 80 a cell 20 directly contacts, and forms an electrical connection with, the cell negative terminal 90 of an adjacent cell 20 Thus, the first force F1 results in an electrical connection being formed between the terminals 80, 90 of pairs of adjacent cells 20 within the first row R1, and the second force F2 results in an electrical connection being formed between the terminals 80, 90 of pairs of adjacent cells 20 within the first column C1. In addition, certain ones of the cells 20 may form an electrical connection with a battery pack housing terminal 6, 7 due to the forces applied by the force generating assemblies 40. In the illustrated embodiment, for example, the cell 20 located in the first row R1 and first column C1 forms an electrical connection with the positive battery pack terminal 6, and the cell 20 located in the fourth row R2 and the first column C1 forms an electrical connection with the negative battery pack terminal 7.

The force generating assembly 40 is used to provide a static force to the pressure contact terminal 80, 90 of a cell 20. The force is used to maintain a direct contact, weld-free electrical connection between adjacent cells 20, or between a cell 20 and other components of the battery pack 1, including battery pack terminals 6, 7, control devices (not shown), disconnect units (not shown), external loads (not shown), etc.

Figure 12:
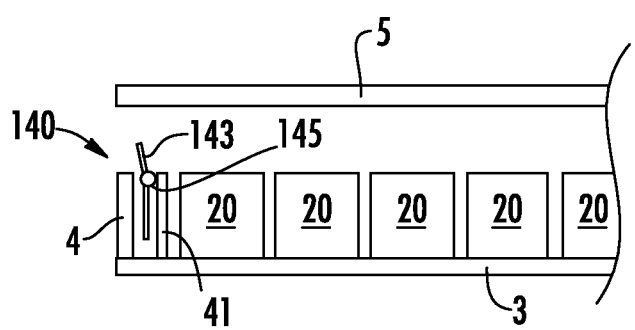
FIG. 12 is an end view of the battery pack illustrating an alternative force generating assembly in the first position, with the sidewall omitted to permit visualization of the cells and the assembly.
Figure 13:
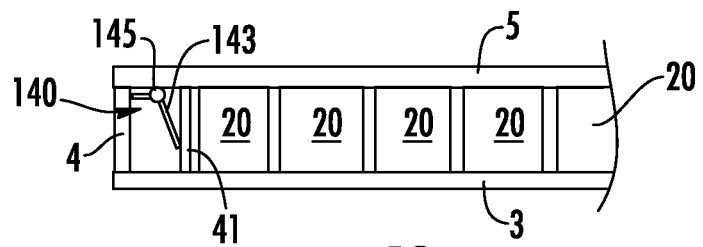
FIG. 13 is an end view of the battery pack illustrating the alternative force generating assembly in the second position, with the sidewall omitted to permit visualization of the cells and the assembly.
Figure 14:
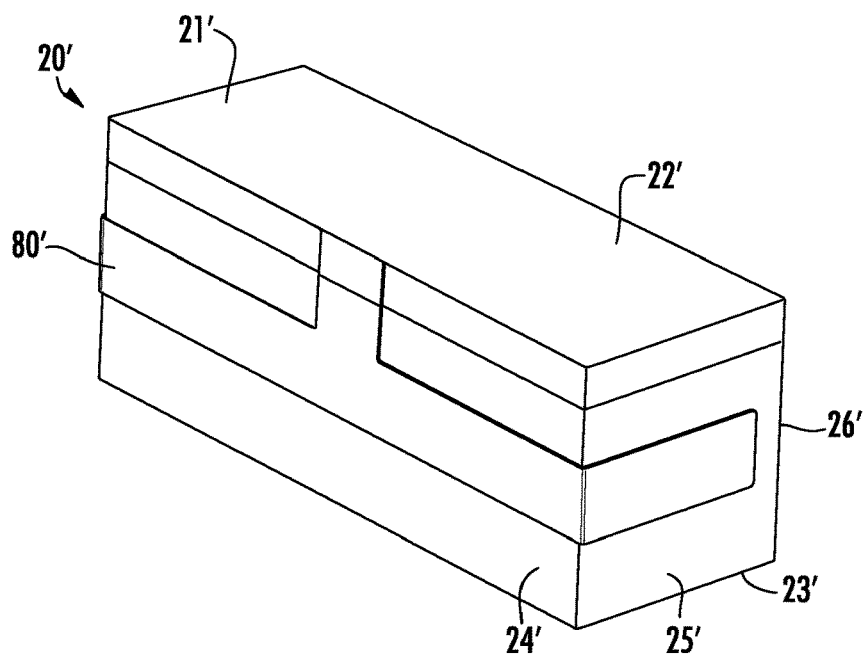
FIG. 14 is a perspective view of the first and second sides of an alternative prismatic cell.
Figure 15:
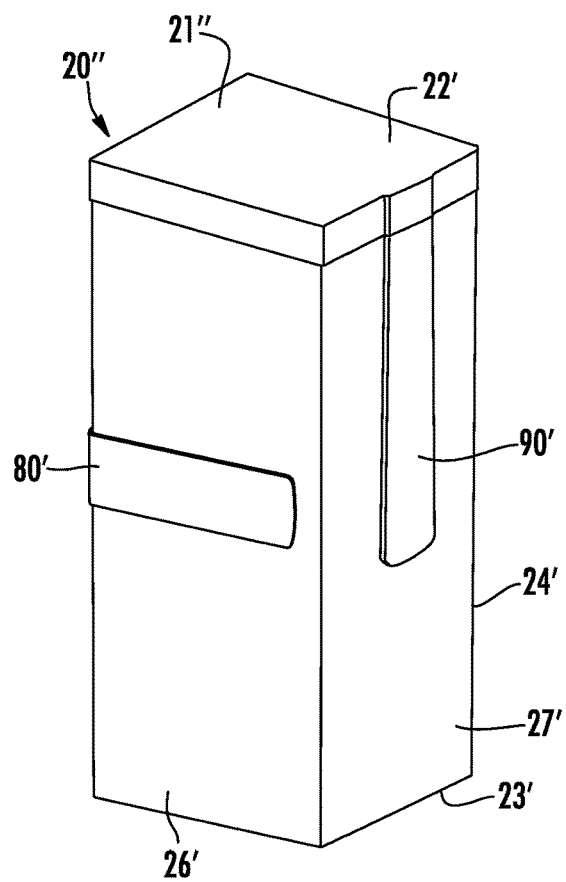
FIG. 15 is a perspective view of the second and third sides of another alternative prismatic cell.

Referring to FIGS. 12 and 13, other types of force generating assemblies may be used to provide the compression forces along the rows and columns of the cell array. For example, an alternative force generating assembly 140 includes the pressure plate 41 and a lever arm 143 that urges the pressure plate away from the battery pack housing sidewall 4. The lever arm 143 is an elongated plate having one end disposed at an obtuse angle relative to an opposed end. The lever arm 143 is rotatably mounted to the battery pack housing sidewall 4 via a pin 145 located between the ends of the lever arm 143. The lever arm 143 is rotatable between a first position and a second position, and is biased toward the first position via a torsion spring (not shown). The lever arm position is determined by the position of the battery pack lid 5. For example, when the lid 5 is open (e.g., spaced apart from the sidewall 4), the lever arm 143 is in the first position as shown in FIG. 12. In the first position, the lever arm 143 does not apply a force to the pressure plate 41 and electrical connections between adjacent cells may not be formed. When the lid 5 is closed (e.g., disposed on the sidewall 4) as shown in FIG. 13, the lever arm 143 is moved to the second position by contact with the lid 5. In the second position, one end of the lever arm 143 engages the battery pack housing lid 5, and the opposed end engages a corresponding pressure plate 41 such that the lever arm 143 urges the pressure plate 41 away from the battery pack housing sidewall 4 and toward the cells 20 of a given row or column. The resulting compression of the cells 20 of the row or column results in formation of direct contact, weld-free electrical connections between adjacent cells 20 of the row or column.

Although the cell 20 has a cube-shaped cell housing 21, the cell housing 21 is not limited to a cube shape. For example, the cell housing 21 may be rectangular in shape. In the alternative embodiment illustrated in FIG. 11, the cell housing 21' has first and third sides 24', 26' and first and second ends 22', 23' that are elongated whereas the second and fourth sides 25', 27' are square. In the alternative embodiment illustrated in FIG. 12, the sides 24", 25", 26", 27" of the cell housing 21" are elongated whereas the first and second ends 22", 23" are square. When the cell housing 21 is rectangular in shape, providing the surface dimensions such that the first dimension (i.e., length) and the second dimension (i.e., width) of the cell housing 21 are each an even multiple of the third dimension (i.e., height) of the cell housing 21 permits close stacking and packing of cells 20 in two and three dimensional arrays. In another example, the cell housing 21 may have other polygonal shapes that permit close packing such as an eight surface structure having hexagonally arranged sides (not shown).

Although the illustrated embodiment includes pouch-type lithium-ion cells 2 that include a "stacked" electrode assembly, the cells 2 are not limited to this cell housing type and/or electrode configuration. For example, the cells 2 may have a prismatic housing and contain a "jelly roll" electrode assembly. In another example, the cells 2 may have a pouch-type housing and contain a "folded" electrode assembly. In still another example, the cells 2 may have a pouch type housing and contain a "jelly roll" electrode assembly.

In the illustrated embodiment, the T-shaped first terminal 80 is connected to the positive electrode plates 61, and the rectangularly-shaped second terminal 90 is connected to the negative electrode plate 62. However, it is contemplated that the T-shaped first terminal 80 may be connected to the negative electrode plates 62, and the rectangularly-shaped second terminal 90 may be connected to the positive electrode plate 61.

In the illustrated embodiment, the terminals 80, 90 are strategically arranged on the outer surface of the cell housing so as to permit the cell housing 21 to form various electrical connections based on the orientation of the cell housing 21. However, strategic portions of the cell housing 21 can be directly connected to the positive and negative electrodes 61, 62 in order to achieve the same effect without employing terminals. For example, the first, second and fourth sides of the cell housing can be directly connected to the positive electrode, and the third side of the cell housing can be directly connected to the negative electrode. Thus the sides 24, 25, 26, 27 of the cell housing 21 can perform the function of the terminals 80, 90 and form electrical connections with adjacent cells.

In the illustrated embodiment, the battery pack 1 includes a two-dimensional array of cells 20 having four rows R1, R2, R3, R4 and five columns C1, C2, C3, C4, C5. However, the battery pack 1 is not limited to a two-dimensional array, and may alternatively house a three-dimensional array of cells 20. In addition, the number of rows and columns provided in the array is not limited to four rows and five columns, rather, the number of rows and columns is determined at least in pan by the power and space requirements of the specific application, and size and shape of the cells 20 used to form the array.

In the illustrated embodiment, the three side-and-one side terminal arrangement is provided on the cell housing to permit electrical interconnections between adjacent battery cells 20. However, the three side-and-one side terminal arrangement may alternatively be provided on other types of energy storage devices such as, but not limited to, battery modules to permit electrical interconnections between adjacent battery modules.

In the illustrated embodiment, the pressure plate 41 is shaped and dimensioned to correspond to the shape and dimensions of a side of the cell housing 21. However, it is understood that the pressure plate may have a different peripheral shape than that of the side of the cell housing. For example, the pressure plate 41 may have a circular peripheral shape while the side of the cell housing has a square peripheral shape.

Selective illustrative embodiments of the battery cell and cell housing are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery cell and battery cell housing been described above, the battery cell and/or battery cell housing is not limited to the working examples described above, but various design alterations may be carried out without departing from the devices as set forth in the claims.

What is claimed is:

1. A battery pack configured to receive an array of electrochemical cells, the battery pack comprising
    a battery pack housing,
    the array of electrochemical cells disposed within the battery pack housing, each cell comprising
    a cell housing formed of a metal film laminate material,
    an electrode assembly disposed in the cell housing, and
    a force generating assembly disposed in the battery pack housing, the force generating assembly configured to apply a first force to the array of electrochemical cells along a first direction and a second force to the array of electrochemical cells along a second direction, where the second direction is orthogonal to the first direction, each of the first force and the second force urging the cells of the array into direct contact with an adjacent cell.

2. The battery pack of claim 1, wherein the first force results in an electrical connection being formed between a first pair of adjacent cells, and the second force results in an electrical connection being formed between a second pair of adjacent cells.

3. The battery pack of claim 1, wherein the force generating assembly comprises
    a pressure plate and
    an elastic member that is disposed between the pressure plate and the battery pack housing,
wherein the pressure plate abuts a cell housing, and the elastic member is arranged to urge the pressure plate away from the battery pack housing.

4. The battery pack of claim 3, wherein the elastic member is a spring.

5. The battery pack of claim 1, wherein the force generating assembly comprises
    a pressure plate, and
    a lever arm rotatably mounted to the battery pack housing, the lever arm rotatable between a first position in which the lever arm does not urge the pressure plate in one of the first direction and the second direction, and a second position in which the lever arm urges the pressure plate in one of the first direction and the second direction.

6. The battery pack of claim 1, wherein each cell comprises an electrically conductive cell positive terminal disposed on an outside of the cell housing, the cell positive terminal being electrically connected to a positive electrode of the electrode assembly, and an electrically conductive cell negative terminal disposed on an outside of the cell housing, the cell negative terminal being electrically connected to a negative electrode of the electrode assembly, wherein the cells are arranged within the battery pack housing such that the cell positive terminal of at least one cell faces the cell negative terminal of an adjacent cell, and the force generating assembly is disposed between at least one of the cells and the cell housing so as to urge the cells of the array into direct contact in such a way that the cell positive terminal of at the least one cell directly contacts, and forms an electrical connection with, the cell negative terminal of the adjacent cell.

7. The battery pack of claim 6, wherein each cell, housing is a rectangular polygon, one of the positive terminal and negative terminal overlies three sides of the cell housing, and the other of the positive terminal and the negative terminal overlies one side of the cell housing, where the one side is different from, and shares a circumference with, the three sides.

8. The battery pack of claim 1, wherein the electrochemical cell array comprises a two dimensional array of cells defined by rows of cells and columns of cells, and a force generating assembly is disposed in the battery pack housing at an end of each row and at an end of each column.

9. A battery pack, the battery pack comprising a battery pack housing including a base plate, and a sidewall that surrounds the base plate, an array of electrochemical cells disposed within the battery pack housing, each cell comprising a cell housing formed of a metal film laminate material, an electrode assembly disposed in the cell housing, an electrically conductive cell positive terminal disposed on an outside of the cell housing, the cell positive terminal being electrically connected to a positive electrode of the electrode assembly, and an electrically conductive cell negative terminal disposed on an outside of the cell housing, the cell negative terminal being electrically connected to a negative electrode of the electrode assembly, and the cells are arranged within the battery pack housing such that the cell positive terminal of at least one cell faces the cell negative terminal of an adjacent cell, and a force generating assembly disposed in the battery pack housing, the force generating assembly comprising a pressure plate and an elastic element disposed between the sidewall and the pressure plate, the force generating assembly disposed between at least one of the cells and the cell housing so as to urge the cells of the array into direct contact in such a way that the cell positive terminal of at the least one cell directly contacts, and forms an electrical connection with, the cell negative terminal of the adjacent cell, the force generating assembly comprising a first a pressure plate and a first elastic element disposed between a first portion of the sidewall and the first pressure plate, the first pressure plate and the first elastic element cooperating to apply a first force to the array of electrochemical cells along a first direction, and a second pressure plate and a second elastic element disposed between a second portion of the sidewall and the second pressure plate, the second pressure plate and the second elastic element cooperating to apply a second force to the array of electrochemical cells along a second direction, where the second direction is orthogonal to the first direction.

10. The battery pack of claim 9, wherein the first force results in an electrical connection being formed between a first pair of adjacent cells, and the second force results in an electrical connection being formed between a second pair of adjacent cells.

11. The battery pack of claim 9, wherein each of the first elastic member and the second elastic member is a spring.

12. The battery pack of claim 9, wherein each cell comprises an electrically conductive cell positive terminal disposed on an outside of the cell housing, the cell positive terminal being electrically connected to a positive electrode of the electrode assembly, and an electrically conductive cell negative terminal disposed on, an outside of the cell housing, the cell negative terminal being electrically connected to a negative electrode of the electrode assembly, wherein the cells are arranged within the battery pack housing such that the cell positive terminal of at least one cell faces the cell negative terminal of an adjacent cell, and the force generating assembly is disposed between at least one of the cells and the cell housing so as to urge the cells of the array into direct contact in such a way that the cell positive terminal of at the least one cell directly contacts, and forms an electrical connection with, the cell negative terminal of the adjacent cell.

13. The battery pack of claim 12, wherein each cell housing is a rectangular polygon, one of the positive terminal and negative terminal overlies three sides of the cell housing, and the other of the positive terminal and the negative terminal overlies one side of the cell housing, where the one side is different from, and shares a circumference with, the three sides.

14. The battery pack of claim 9, wherein the electrochemical cell array comprises a two dimensional array of cells defined by rows of cells and columns of cells, and a force generating assembly is disposed in the battery pack housing at an end of at least one row and at an end of at least one column.

15. The battery pack of claim 9, wherein the electrochemical cell array comprises a two dimensional array of cells defined by rows of cells and columns of cells, and a force generating assembly is disposed in the battery pack housing at each end of each row and at each end of each column.

\* \* \* \* \*

UNITED STATES PATENT AND TRADEMARK OFFICE
CERTIFICATE OF CORRECTION

PATENT NO.        : 10,062,882 B2
APPLICATION NO.   : 15/147592
DATED             : August 28, 2018
INVENTOR(S)       : Robert Schoenherr It is certified that error appears in the above-identified patent and that said Letters Patent is hereby corrected as shown below:

In the Claims

In Column 11, Lines 19-20, Lines 1-2 of Claim 7 should read:
7. The battery pack of claim 6, wherein
each cell housing is a rectangular polygon, In Column 12, Lines 28-31, Lines 7-10 of Claim 12 should read:
an electrically conductive cell negative terminal disposed
    on an outside of the cell housing, the cell negative
    terminal being electrically connected to a negative
    electrode of the electrode assembly, Signed and Sealed this
Fifth Day of February, 2019

Andrei Iancu
*Director of the United States Patent and Trademark Office*